N. A. NEWDICK.
MINE WORKING MACHINE.
APPLICATION FILED JAN. 28, 1916.

1,278,196.

Patented Sept. 10, 1918.
7 SHEETS—SHEET 3.

Witnesses
R. M. McCormick,
A. L. Phelps.

Inventor
Norton A. Newdick
C. O. Shepherd
Attorney.

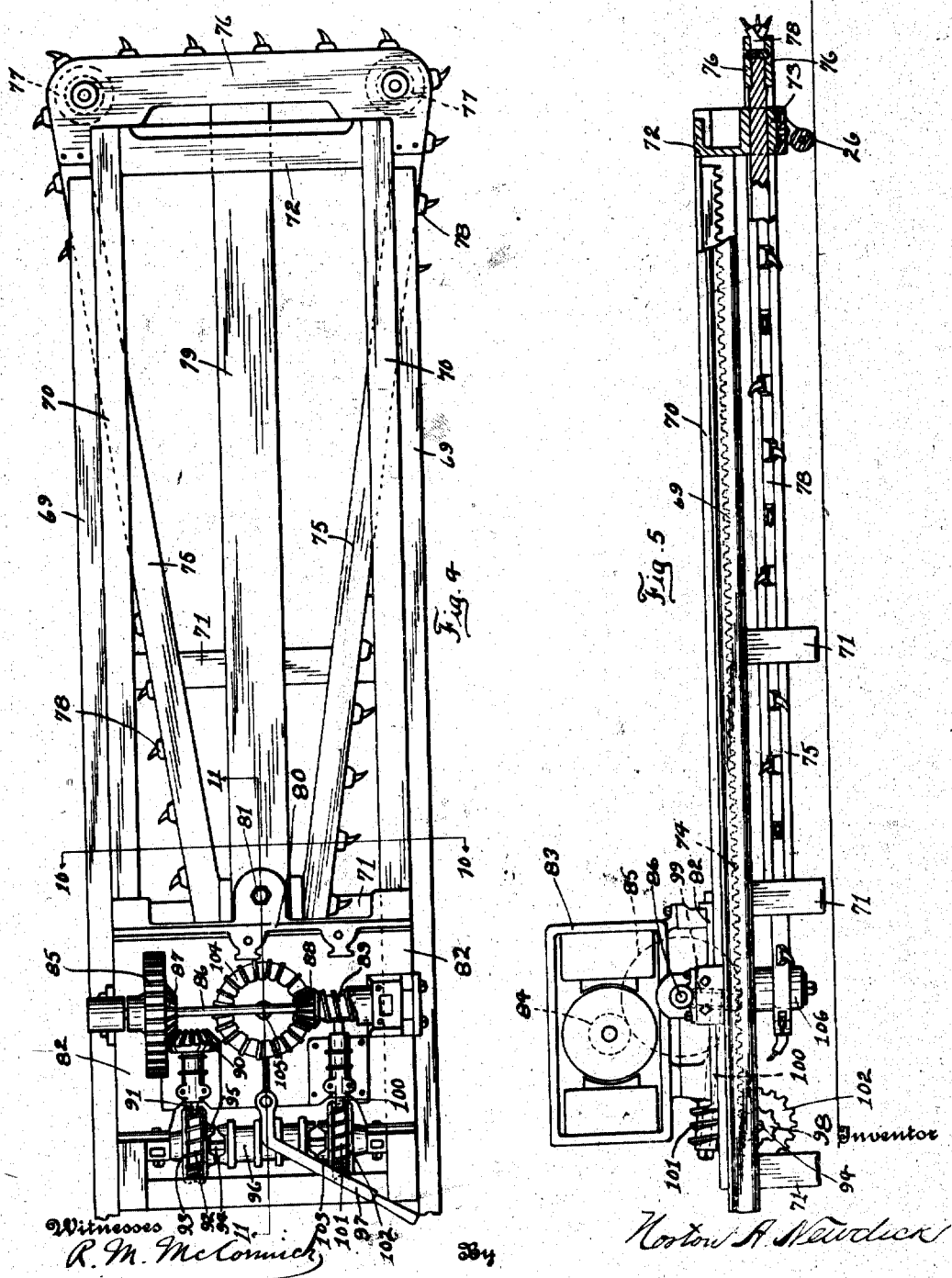

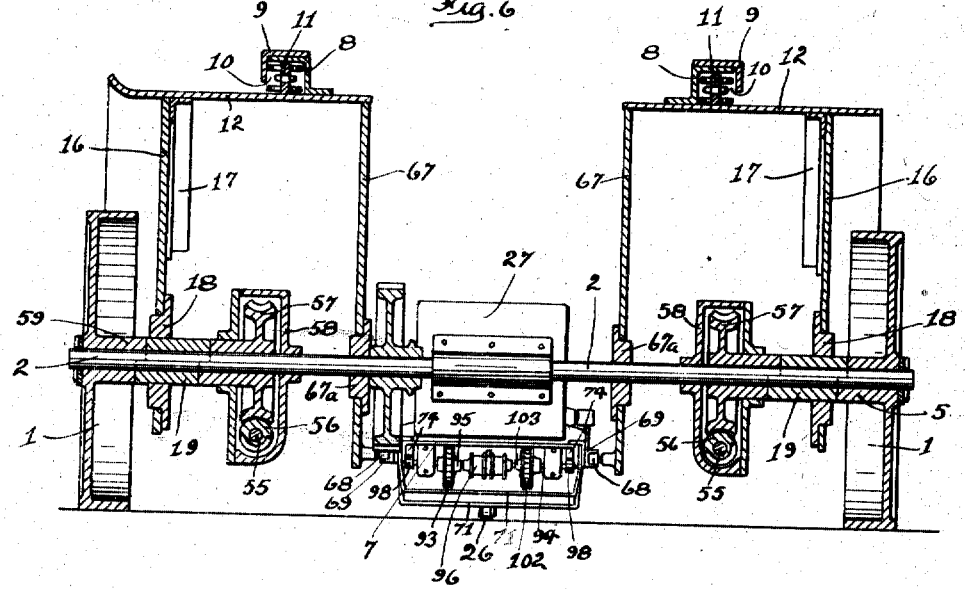
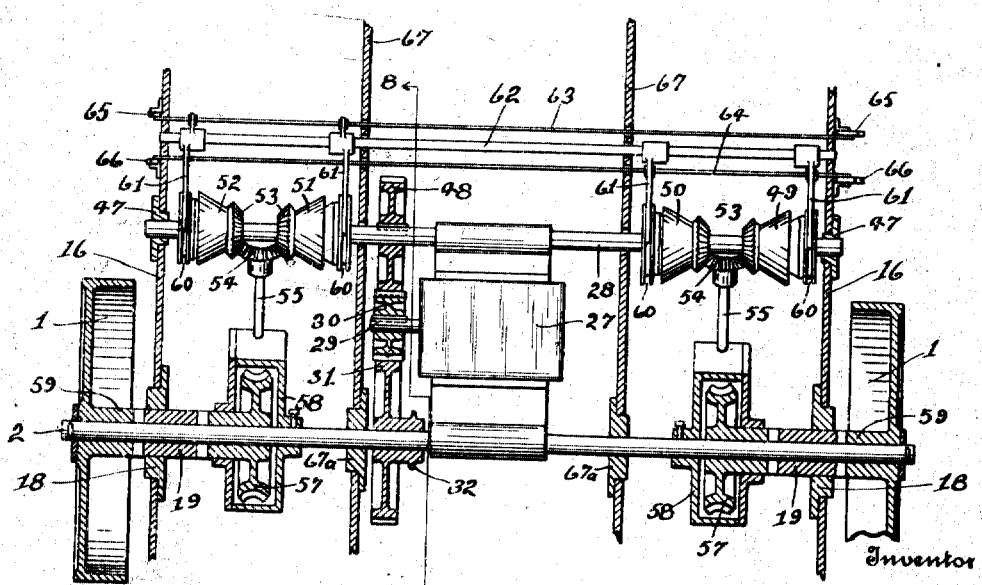

N. A. NEWDICK.
MINE WORKING MACHINE.
APPLICATION FILED JAN. 28, 1916.

1,278,196.

Patented Sept. 10, 1918.
7 SHEETS—SHEET 6.

Witnesses
R. M. McCormick,
A. L. Phelps

Inventor
Norton A. Newdick
By
C. C. Shepherd
Attorney

N. A. NEWDICK.
MINE WORKING MACHINE.
APPLICATION FILED JAN. 28, 1916.

1,278,196.

Patented Sept. 10, 1918.
7 SHEETS—SHEET 7.

Witnesses
R. M. McCormick
A. L. Phelps

Inventor
Norton A. Newdick

By
C. C. Shepherd
Attorney

UNITED STATES PATENT OFFICE.

NORTON A. NEWDICK, OF COLUMBUS, OHIO, ASSIGNOR TO JAMES ELLWOOD JONES OF SWITCHBACK, WEST VIRGINIA.

MINE-WORKING MACHINE.

1,278,196.　　　　Specification of Letters Patent.　　Patented Sept. 10, 1918.

Application filed January 28, 1916. Serial No. 74,744.

*To all whom it may concern:*

Be it known that I, NORTON A. NEWDICK, a citizen of the United States, residing at Columbus, in the county of Franklin and State of Ohio, have invented certain new and useful Improvements in Mine-Working Machines, of which the following is a specification.

This invention relates to mine working machines and is particularly directed to that line of work for handling coal by reclaiming the coal from the ground. Specifically, my machine contemplates a mechanical means for loading the broken down coal into suitable conveyances, such as small mine cars to convey it to the tipple. In my co-pending application, Serial Number 73,814, I have claimed broadly a kerf cutting means combined with a loading means which are so arranged that the kerf cutting structure may assume an operative or an inoperative position, depending upon whether it is desired to make the kerf cut or whether it is desired to mechanically load the coal. The above is combined with means whereby the conveyer and the kerf cutting structure may be made to swing laterally to effect a kerf cut or to sweep the mine floor to collect the coal as the case may be.

In the present case, my machine represents a combination of kerf cutting and loading machine whereby a floor cut may be made. In this connection, the main object of my invention resides in so assembling the parts, that the conveyer may be swung about a horizontal pivot to assume an inoperative position as far as loading is concerned, to permit the extension of the kerf cutting structure along the floor level and the same then swung across the floor to make the cut.

With this broad statement in view, my invention consists in the combination and location of parts as hereinafter claimed. The accompanying drawings represent one embodiment of my invention and in these drawings, similar characters of reference designate corresponding parts, and in which:

Fig. 2 is a plan view of the structure as shown in Fig. 1.

Fig. 4 is a top plan view of the kerf cutting structure shown separately and also shown with the driving motor removed.

Fig. 5 is a side elevation partly in section of the structure shown in Fig. 4.

Fig. 6 is a cross section taken on line 6—6' of Fig. 1.

Fig. 7 is a horizontal section taken on line 7—7 of Fig. 1.

Figure 2:
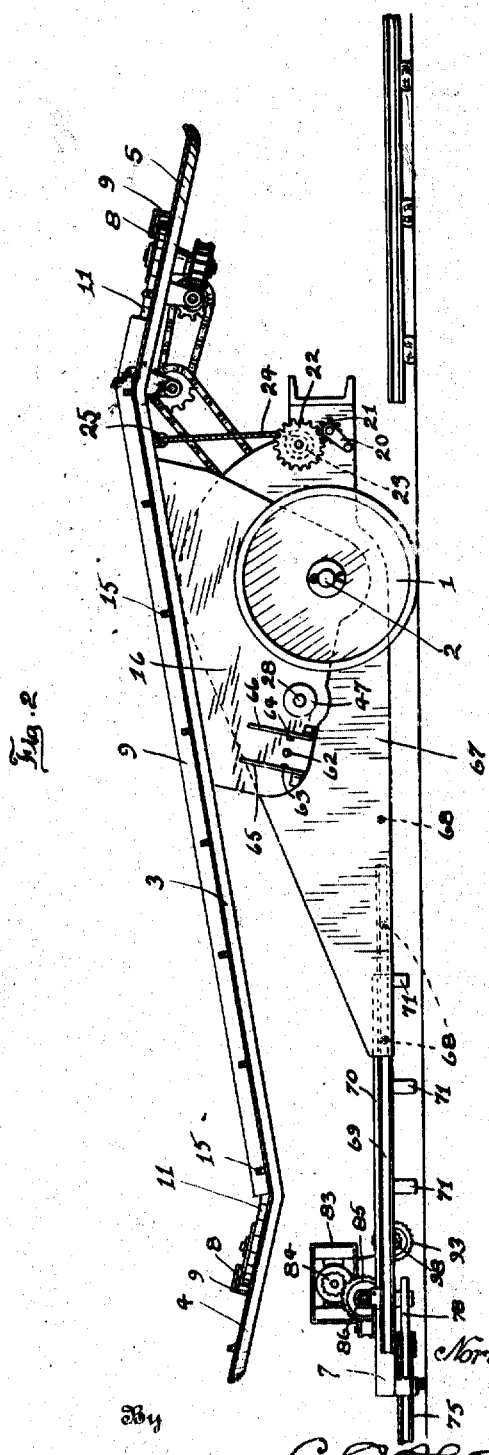
Fig. 2 is a similar view showing the kerf cutting structure extended and the conveyer structure slightly elevated to permit of this extension.
Figure 3:
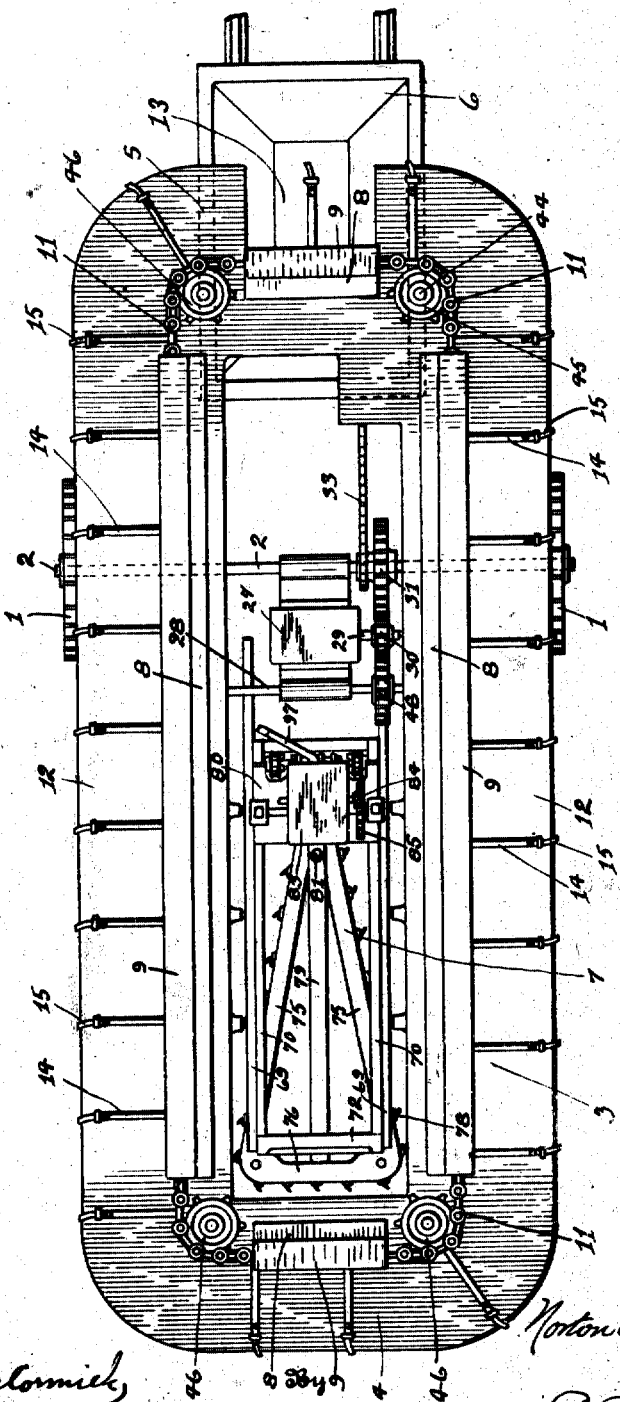

In these drawings, there is shown a base unit or truck comprising essentially a pair of traction wheels 1 mounted upon an axle 2. Mechanism is provided whereby these wheels may be rotated in either a forward or a rearward direction, or one of the wheels may be made to rotate in one direction and the other wheel in the other direction, the latter means being those at present employed for causing a side sweep of the machine, as a whole. This base unit carries in superposed relation a conveyer designated generally by the reference numeral 3 and it will be noted that this conveyer operates about driving and idler sprockets which are horizontally arranged. Further, this conveyer is provided with a forwardly extending depressed extension 4 and a rearwardly horizontally arranged extension 5 positioned directly over any type of conveyance such as a mine car shown at 6. This entire conveyer structure is pivotally mounted to swing about the axle 2 to elevate its forward end or the depressed extension 4 to a position to permit the extension of the kerf cutting structure shown at 7, this latter position being shown in Fig. 2.

Figure 1:
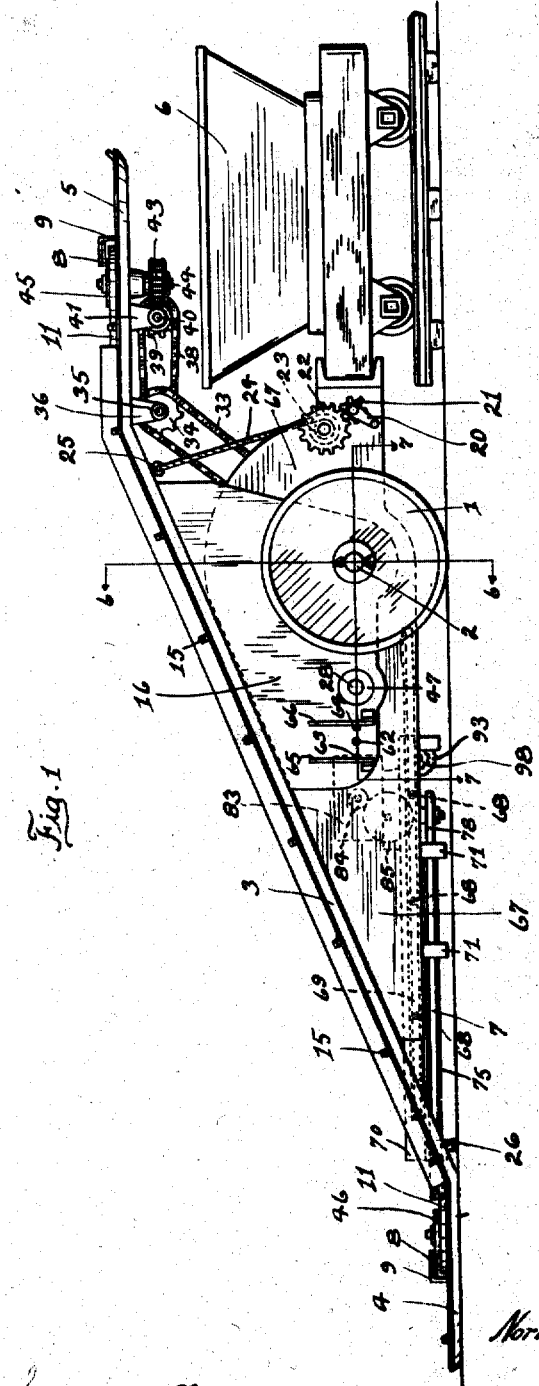
Figure 1 represents a view in side elevation of my mine working machine, with the kerf cutting structure shown in retracted position and the conveyer in its lowered position.
Figure 8:
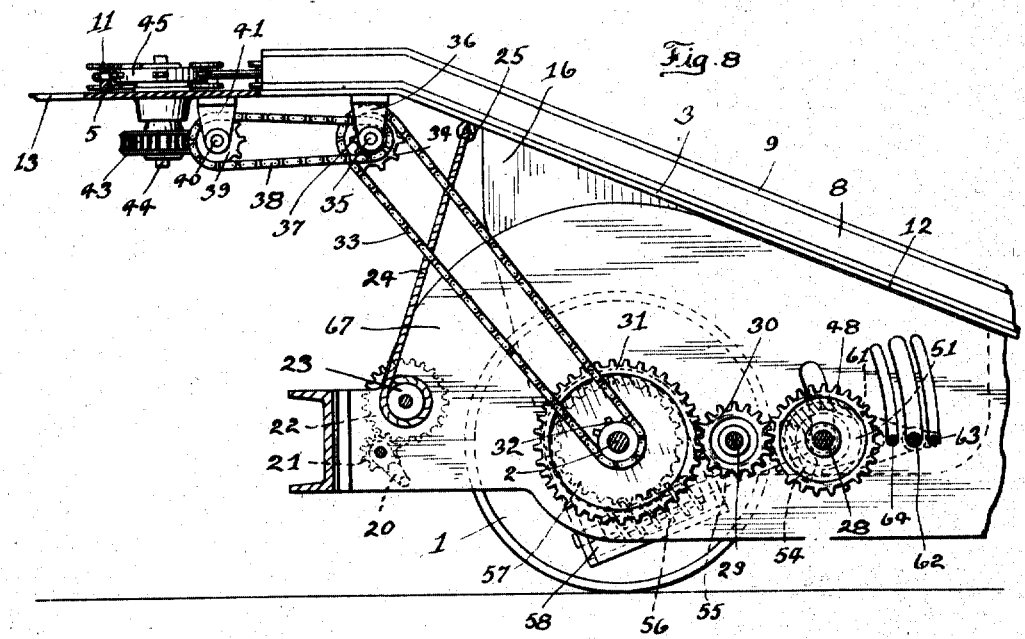
Fig. 8 is a section taken on line 8—8 of Fig. 7.

Reference to Figs. 1, 6 and 8 will show that the conveyer structure comprises a general framework formed of properly bent longitudinally extending Z-bars 8 onto which there are secured the angle irons 9 to form an inclosure space 10, in which the chain 11 is confined. These Z-bars are themselves rigidly mounted upon a pan structure formed of plates 12 extending on both sides of the conveyer and around its lower depressed end, but cut out at the upper rear end as shown at 13 to permit the dumping of the coal into the car 6 when conveyed to this point by means of the flights 14 securely carried by the chain 11. For purposes of convenience, these flights are also preferably provided with cutter teeth 15 at their ends to cut their way into the coal heap more or less as the conveyer is operated. As will be noted from the drawing, the conveyer trough or pan 12 is flat practically throughout its entire working surface and it is upon this that the coal rides in its ascent from the heap to the mine car, the angle irons 9 and Z-bars 8 forming the means of stiffening the trough. This trough is rigidly supported on side plates 16 and is further stiffened by means of the angle irons shown at 17. The lower ends of these plates are securely fastened about bearing members 18, which latter are pivotally or rotatably mounted upon clutch sleeves 19 to be hereinafter described. These clutch sleeves are themselves loosely mounted upon the axle 2 and consequently the mounting of the bearing members on these sleeves is the equivalent of mounting them on the axle 2. By referring to Fig. 1, it will be noted that all that is necessary to elevate the front end of the conveyer frame is the turning of the crank 20, which crank is rigidly connected upon a pinion 21 and this latter meshes with a gear 22 forming a portion of a windlass structure designated 23. To this windlass structure there is secured a rope 24 and the upper end of this rope is secured to the underside of the conveyer frame, as is shown at 25. Thus, a rotation of the crank 20 in the proper direction, will cause an elevation of the front end of the conveyer frame and a motion in the reverse direction of the crank will cause a lowering of this frame for it to rest upon the ground by means of its own weight. At this point, it may be well to mention that the front end of the kerf cutting structure 7 which carries the caster 26 carries the weight of the front end of the machine as a whole, when the conveyer is elevated.

Figure 9:
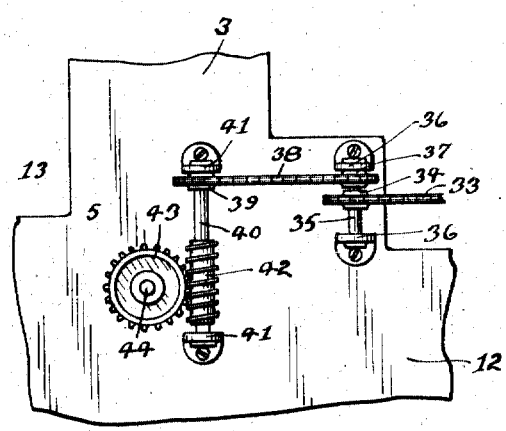
Fig. 9 is a bottom plan view of the drive connection of the conveyer as shown to the left of Fig. 8.
Figure 10:
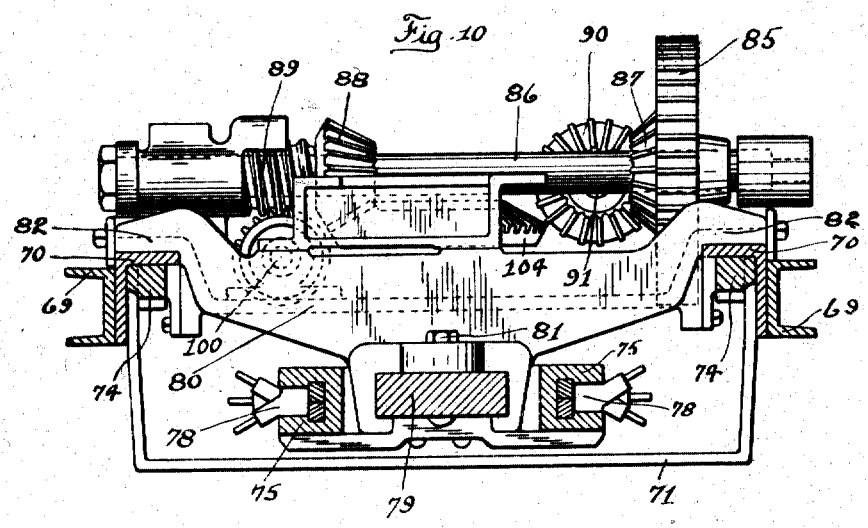
Fig. 10 is a section taken on line 10—10 of Fig. 4.
Figure 11:
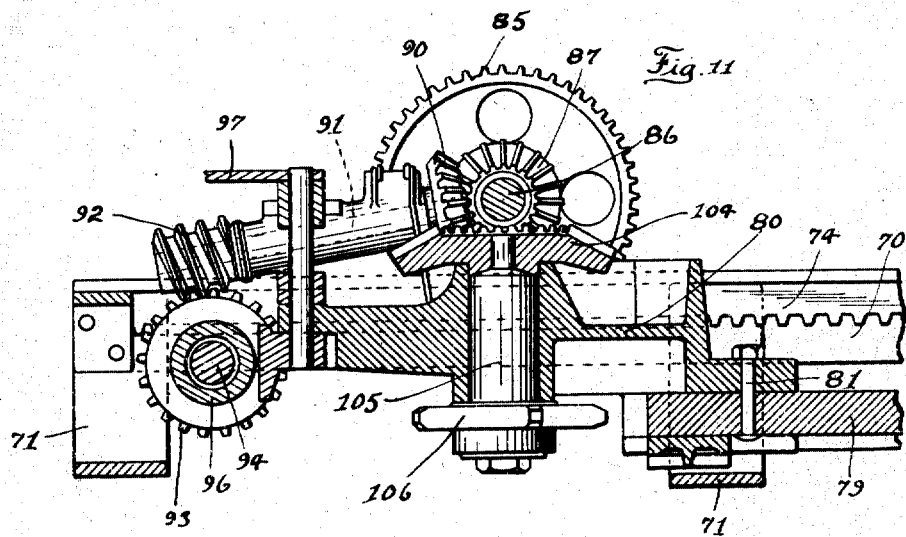
Fig. 11 is a section taken on line 11—11 of Fig. 4.

The manner of driving the conveyer is as follows: Referring particularly to Figs. 6 and 7, it will be noted that there is provided a motor 27 which is supported upon the axle 2 and upon a counter shaft 28. The armature shaft 29 of this motor is provided with a gear wheel 30, which in turn meshes with a gear wheel 31 loosely mounted upon the axle 2. This gear wheel 31 is provided with a hub extension which forms a sprocket as shown at 32 and a chain 33, Fig. 8, passing over a sprocket 34 also engages this sprocket 32. The sprocket 34 is rigidly carried by a shaft 35 supported in brackets 36 carried by the underside of the conveyer frame and this shaft is further provided with a second sprocket 37 over which a chain 38 passes. This chain 38 also engages a sprocket 39 carried on a shaft 40, which latter is also supported in brackets 41 carried on the underside of the frame. Referring to Fig. 9 it will be noted that this shaft 40 is also provided with a worm 42 and this worm meshes with a worm wheel 43 carried by one of the corner shafts of the conveyer. This shaft has been designated 44 and its upper end is provided with a drive sprocket 45, over which the conveyer chain 11 passes. The remaining sprocket wheels 46 of the conveyer are all idle sprockets and are, therefore, loosely mounted on their respective shafts. Therefore, whenever it is desired to set the conveyer in operation, the switch governing the current to the motor 27, is closed. Should it be desired to rotate the conveyer in the opposite direction, the current to the motor may be reversed so that this motor itself will run in a reverse direction.

The mechanism for controlling the bodily movement of the conveyer, will now be described. The axle 2, as has been related, is provided with a pair of traction wheels 1 and mechanism is provided whereby these traction wheels may both be moved in either a forward or reverse direction or one may be moved in a forward and the other in a reverse direction, the latter arrangement being provided to cause the conveyer to sweep the mine floor to gather all of the dislodged coal. The counter shaft 28 is journaled in the side plates 16 by means of hub boxes 47 and this shaft is further provided with a gear wheel 48 arranged to mesh with the motor gear wheel 30. In this manner the shaft 28 is rotated whenever the motor 27 is set in operation and in order to drive the traction wheels, the shaft 28 has been provided with four friction clutches designated respectively 49, 50, 51 and 52. The cone portions, or the inside portions of each of these clutch members is rigidly connected with the shaft 28, while the shell or outside member is loosely mounted on this shaft, but each is provided with a bevel gear 53. Meshing with these gears 53 are bevel pinions 54 mounted upon angularly disposed shafts 55, which latter carry worms 56 on their lower ends. These worms then in turn mesh with worm wheels 57 loosely mounted on the axles 2 and housed within the housings 58. The outside faces of the hubs of each of the worm wheels 57 is formed with a clutch designed to mesh with the clutch collar 19 and the opposite end of this clutch collar is similarly formed with a clutch face to engage the hubs 59 of the traction wheels 1.

1. Each of the cone portions or movable portions of the friction clutches is provided with a groove 60 in which yokes 61 operate. All of these yokes are slidably mounted upon a rod 62 securely fastened in the side frames 16 and the extreme upper ends of the yoke engaging clutches 51 and 52 are rigidly connected with a rod 63 slidably mounted in the side plates 16, while the remaining two yokes or those operating in conjunction with the clutches 49 and 50 are rigidly mounted in connection with slide rods 64. These two slide rods are controlled by means of handles 65 and 66 respectively, these handles being mounted on each side of the machine as a whole, so that control may be effected when the operator happens to be on either side of the machine. These handles 65 and 66 are pivoted at their lower ends to the frame plates and their connection with the slide rods is a pivotal mounting intermediate their ends.

Therefore, a movement of both the handles 65 and 66 toward the left of Fig. 7, will cause an engagement between the parts of the friction clutches 49 and 51 and then through the medium of the gear wheels 53 and 54 on the shafts 55 and the worm 56 and the worm wheel 57 and clutch collars 19, the wheels 1 will be rotated in a forward direction. Movement of both of the handles 65 and 66 in the opposite direction will bring the other two clutches into working operation to cause a reverse movement of the traction wheels. Movement of the handle 65 toward the left and the handle 66 toward the right will bring the working parts of the clutches 51 and 50 into engagement and because both the traction wheels 2 and the worm wheels 57 are loosely mounted on the axle 2, the traction wheels themselves will be rotated in opposite directions through the medium of the clutch collars 19. Therefore, this latter arrangement will cause the machine as a whole, to pivot about a center substantially in the center of the axle 2 and in consequence the forward end or the depressed extension 4 of the conveyer will be made to sweep the mine floor.

The kerf cutting structure used in connection with the present machine, will now be described, it being understood that it is first necessary to swing the conveyer structure about its pivot 2 to elevate the depressed extension 4 to give room for the outward movement of the kerf cutting structure. This kerf cutting structure is much like the machines now on sale, but these machines as a whole, are mounted in a supplementary frame comprising a pair of side frame plates 67 carrying rollers 68 adjacent their lower edges and being pivotally mounted about the axle 2 by means of the bearing members 67ª. These rollers 68 slide in channel members 69 which in reality form a third frame for the mining machine itself. As is well known, a mining machine comprises what is known as a stationary member and a movable or cutter member and it is upon these channel members 69 that the so-called stationary member is rigidly mounted to enable the kerf cutting machine as a whole to be moved forward by sliding the channel members 69 over the rollers 68. This stationary member comprises an angle iron structure 70 held properly spaced by means of tie plates 71 and a front piece formed of members 72 and 73, it being to the latter that the caster 26 is secured. The angle iron framework is provided on its under surface with a pair of racks 74 by means of which the cutter member is moved forward. This cutter member comprises a pair of side channels 75 of a well known construction which are securely held spaced at their forward ends by means of a pair of opposed plates 76 between which sprocket wheels 77 are rotatably journaled. The channel members 75 form a guide for the cutter chain 78 and it is over the sprocket 77 that this cutter chain passes. This cutter member also includes a central bar 79 which, at its forward end slides between the front plates 72 and 73 of the stationary member and which carries the driving or operating mechanism at its rear end. This driving mechanism comprises a motor support plate 80 rigidly secured to the central bar 79 by means of a bolt shown at 81 and further provided with laterally extending ears 82 which slide upon the upper surface of the angle stationary member 70. Upon this motor support plate 80, the motor 83 is supported and the armature shaft of this motor carries a pinion 84. This latter pinion meshes with a spur gear 85 rigidly mounted on a shaft 86 which is suitably journaled in the motor support framework and which shaft is also provided with bevel pinions 87 and 88 and a worm 89. The pinion 87 meshes with a bevel gear 90 mounted upon a shaft 91 which carries a worm 92 at its lower end. This latter worm meshes with a worm wheel 93 loosely mounted on a shaft 94 and it is this shaft on which the control is mounted. The worm wheel 93 itself is provided with a clutch face 95 designed to coöperate with a clutch collar 96 itself slidably keyed on the shaft 94 and operated by means of a yoke lever 97. On each end of the shaft 94 there is mounted a spur pinion 98 which coöperates with one of the racks 74 and, therefore, when the clutch collar 96 is shifted to a position of engagement with the worm 95, this shaft 94 is caused to rotate, which in turn causes the pinions 98 to engage the rack bar 74 to cause a forward feed. To retract the slide or cutter member, the worm 89 is provided. This worm 89 meshes with a worm wheel 99. This worm wheel is mounted on a shaft 100 which carries a worm 101 at its other end, which worm is designed to mesh with a worm wheel 102 also slidably mounted on the shaft 94 and this worm wheel is further provided with a clutch face 103. Thus, when the clutch collar is moved to engage the clutch face 103, it is out of engagement with the clutch face 95 and, therefore, the worm wheel 93 is idle on this shaft, while the worm wheel 102 is rigidly connected with the same. Because of the driving connection between the shaft 86 and this worm wheel through the medium of the worm 89, worm wheel 99 and worm 101, the shaft 94 will be rotated in a direction reverse to that previously described, thus causing a rotation in the reverse direction of the spur pinions 98, which in turn causes a retraction of the machine. To drive the cutter chains the shaft 86 is provided with the bevel pinion 88 which meshes with a bevel gear 104 which latter is in turn mounted on a shaft 105 which carries a driving sprocket 106 for these cutter chains.

From the foregoing description, taken in connection with the accompanying sheets of drawings, it will be apparent that I have provided a machine of some considerable utility. This follows from the fact that all of the necessary operations may be performed by the same machine and the several functions performed by this machine are all accomplished by a common movement. Thus, when it is desired to use the kerf cutting structure, the conveyer structure is swung about its pivot 2 to elevate the forward extension 4 to a position sufficient to permit the extension of the kerf cutting structure within the channel members 69. After this has been accomplished, the cutter member is extended and it may eat its way into the coal face, or it may be fully extended before hand and the entire machine moved forward to force its entry into the coal face. After this, the traction wheels are driven so that one rotates in one direction and the other in the opposite direction, whereby a cut across the entire face is effected. The kerf cutting structure is then retracted and the conveyer structure lowered to assume the position shown in Fig. 1 and after the coal has been broken down in any desired manner, a further sweep of this conveyer structure across the floor following the same motion as that used for the kerf cutting structure, or, in other words, driving one of the traction wheels in one direction and the other in the other direction, will sweep the mine floor to clear it of the broken down coal.

What I claim, is:

1. A mine working machine comprising a base unit, a conveyer structure mounted to swing about a horizontal pivot, a kerf cutting structure located beneath said conveyer structure relatively movable with respect to said conveyer structure when its nose portion is elevated by movement about the pivot center to assume an operative or inoperative position, and means for swinging said conveyer and kerf cutting structures sidewise to cut the kerf when the kerf cutting structure is in operative position and the conveyer elevated and to sweep the mine floor when the kerf cutting structure is in inoperative position and the conveyer lowered.

2. A mine working machine comprising a base unit, a conveyer structure mounted to swing about a horizontal pivot, a depressed forward extension on said conveyer, a kerf cutting structure located beneath said conveyer structure and mounted to assume an extended operative position forward of said depressed extension after said conveyer has been swung up about its pivot, and means for swinging said conveyer and kerf cutting structures sidewise to cut a floor kerf when the kerf cutting structure is in operative position and the conveyer elevated, and to sweep the mine floor with said extension when the kerf cutting structure is in inoperative position and the conveyer lowered.

3. A mine working machine comprising a base unit, a conveyer structure mounted to swing about a horizontal pivot, a depressed forward extension on said conveyer, means for swinging said conveyer about its horizontal pivot, a kerf cutting structure located beneath said conveyer structure and mounted to assume an extended operative position forward of said depressed extension after said conveyer has been swung up about its pivot, and means for swinging said conveyer and kerf cutting structures sidewise to cut a floor kerf when the kerf cutting structure is in operative position and the conveyer elevated, and to sweep the mine floor with said extension when the kerf cutting structure is in inoperative position and the conveyer lowered.

4. A mine working machine comprising a base unit, a conveyer structure mounted to swing about a horizontal pivot, a depressed forward extension on said conveyer, a windlass structure carried by said base unit, a cable for said windlass attached to said conveyer structure to the rear of its horizontal pivot, a kerf cutting structure located beneath said conveyer structure and mounted to assume an extended operative position forward of said depressed extension after said conveyer has been swung up about its pivot, and means for swinging said conveyer and kerf cutting structures sidewise to cut a floor kerf when the kerf cutting structure is in operative position and the conveyer elevated, and to sweep the mine floor with said extension when the kerf cutting structure is in inoperative position and the conveyer lowered.

5. A mine working machine comprising a two-wheeled base unit, a conveyer structure pivotally mounted on the axle of said unit, means for swinging said conveyer about its pivot, a depressed forward extension on said conveyer, a kerf cutting structure located beneath said conveyer structure and mounted to assume an extended operative position forward of said depressed extension after said conveyer has been swung up above its pivot, and means for turning one of the wheels of said units in one direction and the other wheel in the other direction to cut a floor kerf when the kerf cutting structure is in operative position and the conveyer elevated, and to sweep the mine floor with said extension when the kerf cutting structure is in inoperative position and the conveyer lowered.

6. A mine working machine comprising a two-wheeled base unit, a conveyer structure pivotally mounted on the axle of said unit, means for swinging said conveyer about its pivot, a kerf cutting structure located beneath said conveyer structure and mounted to assume an extended operative position forward of the nose of said conveyer after said conveyer has been swung up about its pivot and arranged to form the forward support of the machine as a whole, and means for swinging said conveyer and kerf cutting structures sidewise to cut a floor kerf when the kerf cutting structure is in operative position and the conveyer elevated, and to sweep the mine floor when the kerf cutting structure is in inoperative position and the conveyer lowered.

7. A mine working machine comprising a base unit, a conveyer structure mounted to permit a horizontal sweep movement, a kerf cutting structure in addition to said conveyer structure, means whereby said kerf cutting structure may be relatively advanced to project out beyond the end of said conveyer structure, and means for swinging said kerf cutting structure sidewise in a movement which substantially conforms to the sweeping movement of said conveyer structure.

8. A mine working machine comprising a base unit, a conveyer structure mounted to permit a horizontal sweep movement, a kerf cutting structure in addition to said conveyer structure, means whereby said kerf cutting structure may be relatively advanced to project out beyond the end of said conveyer structure, means for operating said kerf cutting structure independently of the operation of said conveyer structure, and means for swinging said cutting structure sidewise in a movement which substantially conforms to the sweeping movement of said conveyer structure.

9. A mine working machine comprising a base unit, a conveyer structure mounted to permit a horizontal sweep movement, a kerf cutting structure in addition to said conveyer structure, means whereby said kerf cutting structure may be relatively advanced to project out beyond the end of said conveyer structure, and means for swinging said kerf cutting structure sidewise simultaneously with and in a movement which substantially conforms to the sweeping movement of said conveyer structure.

In testimony whereof I affix my signature in presence of two witnesses.

NORTON A. NEWDICK.

Witnesses:
WALTER E. L. BOCK,
A. L. PHELPS.